United States Patent
Duell et al.

(10) Patent No.: US 10,075,537 B2
(45) Date of Patent: Sep. 11, 2018

(54) ACTION EXECUTION ARCHITECTURE FOR VIRTUAL MACHINES

(71) Applicant: Accenture Global Services Limited, Dublin (IE)

(72) Inventors: Mark Duell, Worcester (GB); Thomas W. Myers, LaGrange, IL (US); Jack Q. W. Cantwell, Bainbridge Island, WA (US)

(73) Assignee: Accenture Global Services Limited, Dublin (IE)

( * ) Notice: Subject to any disclaimer, the term of this patent is extended or adjusted under 35 U.S.C. 154(b) by 260 days.

(21) Appl. No.: 14/837,959

(22) Filed: Aug. 27, 2015

(65) Prior Publication Data

US 2017/0064012 A1    Mar. 2, 2017

(51) Int. Cl.
| | | |
|---|---|---|
| *G06F 3/048* | (2013.01) | |
| *G06F 3/00* | (2006.01) | |
| *H04L 29/08* | (2006.01) | |
| *G06F 3/0484* | (2013.01) | |
| *H04L 12/911* | (2013.01) | |
| *G06F 3/0482* | (2013.01) | |
| *G06F 9/54* | (2006.01) | |

(52) U.S. Cl.
CPC ............ *H04L 67/16* (2013.01); *G06F 3/0482* (2013.01); *G06F 3/04842* (2013.01); *G06F 9/547* (2013.01); *H04L 47/822* (2013.01); *H04L 67/10* (2013.01); *H04L 67/22* (2013.01); *G06F 2209/548* (2013.01)

(58) Field of Classification Search
CPC ... G06F 9/44; G06F 9/45; G06F 3/048; G06F 3/00; H04L 67/00; H04L 47/70
See application file for complete search history.

(56) References Cited

U.S. PATENT DOCUMENTS

| | | |
|---|---|---|
| 6,725,378 B1 | 4/2004 | Schuba |
| 6,925,642 B1 | 8/2005 | Commander |

(Continued)

FOREIGN PATENT DOCUMENTS

| | | |
|---|---|---|
| EP | 3136234 A1 | 3/2017 |
| WO | WO 2010035281 A1 | 4/2010 |

(Continued)

OTHER PUBLICATIONS

Buyya, et al., "Market-Oriented Cloud Computing Vision, Hype and Reality for Delivering IT Services as Computing Utilities," High Performance Computing and Communications, Sep. 25, 2008, pp. 5-13, HPCC 08, 10th IEEE International Conference, Piscataway, New Jersey.

(Continued)

*Primary Examiner* — Hugo Molina

(74) *Attorney, Agent, or Firm* — Brinks Gilson & Lione

(57) ABSTRACT

Cloud computing technical components are provisioned into many different service platforms provided by many different service providers. Once provisioned, it is often the case that actions need to be performed against the technical components. An action execute architecture executes the actions across a wide range of disparate service providers hosting both public and private target hosting platforms, while also providing a much more flexible and dynamic environment for implementing and deploying those actions.

16 Claims, 12 Drawing Sheets

(56) References Cited

U.S. PATENT DOCUMENTS

| | | | |
|---|---|---|---|
| 6,963,828 B1 | 11/2005 | McDonald | |
| 6,978,422 B1* | 12/2005 | Bushe | G06F 9/4443 |
| | | | 709/223 |
| 7,249,176 B1 | 7/2007 | Salas et al. | |
| 7,376,693 B2 | 5/2008 | Neiman et al. | |
| 7,668,703 B1 | 2/2010 | Rolia | |
| 7,747,750 B1 | 6/2010 | Simon et al. | |
| 8,341,270 B2 | 12/2012 | Mazzaferri et al. | |
| 8,458,700 B1 | 6/2013 | Arrance et al. | |
| 8,484,355 B1 | 7/2013 | Lochhead et al. | |
| 8,886,806 B2 | 11/2014 | Tung et al. | |
| 8,931,038 B2 | 1/2015 | Pulier et al. | |
| 9,274,824 B2 | 3/2016 | Blake et al. | |
| 9,525,754 B1* | 12/2016 | Roytman | H04L 67/32 |
| 9,600,644 B2* | 3/2017 | Moyle | G06F 8/425 |
| 2003/0107597 A1* | 6/2003 | Jameson | G06F 9/4443 |
| | | | 715/762 |
| 2003/0187659 A1* | 10/2003 | Cho | H04L 12/2803 |
| | | | 704/275 |
| 2003/0200300 A1 | 10/2003 | Melchione | |
| 2004/0006589 A1 | 1/2004 | Maconi et al. | |
| 2004/0111506 A1 | 6/2004 | Kundu | |
| 2005/0044220 A1 | 2/2005 | Madhavan | |
| 2005/0045373 A1* | 3/2005 | Born | G06F 3/0482 |
| | | | 174/254 |
| 2005/0080838 A1 | 4/2005 | Colby et al. | |
| 2006/0153090 A1 | 7/2006 | Bishop | |
| 2007/0043860 A1 | 2/2007 | Pabari | |
| 2007/0283011 A1* | 12/2007 | Rakowski | H04L 41/0803 |
| | | | 709/225 |
| 2008/0077512 A1* | 3/2008 | Grewal | G05B 19/05 |
| | | | 705/28 |
| 2008/0091806 A1 | 4/2008 | Shen | |
| 2008/0114624 A1 | 5/2008 | Kitts | |
| 2008/0244233 A1 | 10/2008 | Wilson | |
| 2008/0244579 A1 | 10/2008 | Muller | |
| 2008/0250267 A1 | 10/2008 | Brown | |
| 2009/0083390 A1 | 3/2009 | Abu-Ghazaleh et al. | |
| 2009/0300210 A1 | 12/2009 | Ferris | |
| 2009/0327495 A1 | 12/2009 | Betts-LaCroix et al. | |
| 2010/0042720 A1 | 2/2010 | Stienhans et al. | |
| 2010/0217864 A1 | 8/2010 | Ferris | |
| 2010/0306377 A1 | 12/2010 | DeHann et al. | |
| 2010/0332617 A1 | 12/2010 | Goodwin et al. | |
| 2011/0087776 A1 | 4/2011 | Tabone et al. | |
| 2011/0087783 A1 | 4/2011 | Annapureddy et al. | |
| 2011/0131306 A1 | 6/2011 | Ferris et al. | |
| 2011/0166952 A1 | 7/2011 | Manchikanti | |
| 2011/0191838 A1 | 8/2011 | Yanagihara | |
| 2011/0213712 A1* | 9/2011 | Hadar | G06Q 30/04 |
| | | | 705/80 |
| 2011/0296021 A1 | 12/2011 | Dorai et al. | |
| 2012/0030356 A1 | 2/2012 | Fletcher | |
| 2012/0102183 A1 | 4/2012 | Murakami et al. | |
| 2012/0124211 A1* | 5/2012 | Kampas | G06F 9/50 |
| | | | 709/226 |
| 2012/0124580 A1* | 5/2012 | Bouchier | G06F 9/4843 |
| | | | 718/1 |
| 2012/0284708 A1 | 11/2012 | Anderson, III et al. | |
| 2012/0311157 A1 | 12/2012 | Erickson et al. | |
| 2013/0036422 A1* | 2/2013 | Rao | G06F 9/541 |
| | | | 718/102 |
| 2013/0066940 A1 | 3/2013 | Shao | |
| 2013/0085720 A1* | 4/2013 | Xie | G06F 9/455 |
| | | | 703/1 |
| 2013/0219211 A1 | 8/2013 | Gopinath et al. | |
| 2013/0263209 A1* | 10/2013 | Panuganty | H04L 43/04 |
| | | | 726/1 |
| 2013/0268588 A1 | 10/2013 | Chang et al. | |
| 2013/0268917 A1* | 10/2013 | Chandrasekharan | G06F 8/30 |
| | | | 717/126 |
| 2014/0172782 A1 | 6/2014 | Schuenzel et al. | |
| 2014/0365662 A1* | 12/2014 | Dave | H04L 67/10 |
| | | | 709/226 |
| 2015/0067171 A1* | 3/2015 | Yum | H04L 67/2809 |
| | | | 709/226 |
| 2015/0156065 A1* | 6/2015 | Grandhe | H04L 41/5054 |
| | | | 709/224 |
| 2015/0212824 A1* | 7/2015 | Reinauer | G06F 9/4401 |
| | | | 713/2 |
| 2015/0373103 A1* | 12/2015 | Tessier | G06F 9/5072 |
| | | | 709/203 |
| 2016/0021019 A1* | 1/2016 | Parikh | G06F 9/45558 |
| | | | 709/226 |
| 2016/0127253 A1* | 5/2016 | Patel | H04L 47/70 |
| | | | 709/226 |

FOREIGN PATENT DOCUMENTS

| | | |
|---|---|---|
| WO | WO 2012/021324 A2 | 2/2012 |
| WO | WO 2015/034486 A1 | 3/2015 |

OTHER PUBLICATIONS

Prodan, et al., "A Survey and Taxonomy of Infrastructure as a Service and Web Hosting Cloud Providers," Oct. 13, 2008, pp. 17-25, 10th IEEE International Conference on Grid Computing, Piscataway, New Jersey.

Qian, et al., "Cloud Computing: An Overview," Jan. 1, 2009, pp. 626-631, Cloud Computing, vol. 5931, Springer-Verlag GmbH, Germany.

Vecchiola, et al., "Aneka: A Software Platform for .NET-based Cloud Computing," 2009, pp. 1-30, IOS Press, Fairfax, Virginia.

Tag Instances, https://elasticbox.com/documentation/managing-your-organization/resource-tags/, downloaded Jul. 20, 2015, pp. 1-8, ElasticBox, Inc., San Francisco, California.

Hector Fernandez, Surprised by your Cloud Bill every month? Try Cross-Cloud Tagging, Oct. 23, 2014, pp. 1-3, ElasticBox, Inc., San Francisco, California.

Cisco Prime Service Catalog 10.1 Adapter Integration Guide, Nov. 2014, pp. 1-364, Cisco Systems, Inc., San Jose, California.

Designing Integrations with Service Link Standard Adapters, Chapter 4, Cisco Prime Service Catalog 10.1 Adapter Integration Guide, Nov. 2014, pp. 1-72, Cisco Systems, Inc., San Jose, California.

International Search Report, App. No. PCT/EP2015/078653 dated Feb. 15, 2016, pp. 1-13.

Naik, et al., Architecture for Service Request Driven Solution Delivery Using Grid Systems, 2006, pp. 1-9, IEEE International Conference on Services Computing, Piscataway, New Jersey.

Patent Examination Report No. 1, App. No. 2016204578, dated Aug. 17, 2016, pp. 1-7, Australia.

Patent Examination Report No. 2, App. No. 2016204578, dated Nov. 24, 2016, pp. 1-5, Australia.

Patent Examination Report No. 3, AU Patent App. No. 2016204578, dated May 1, 2017, pp. 1-2, Australia.

* cited by examiner

ACTION EXECUTION ARCHITECTURE FOR VIRTUAL MACHINES

TECHNICAL FIELD

This application relates to executing actions on technical components, such as virtual machines and other resources, provisioned into a complex global network architecture of virtualized resources.

BACKGROUND

The processing power, memory capacity, network connectivity and bandwidth, available disk space, and other resources available to processing systems have increased exponentially in the last two decades. Computing resources have evolved to the point where a single physical server may host many instances of virtual machines and virtualized functions. These advances had led to the extensive provisioning of a wide spectrum of functionality for many types of entities into specific pockets of concentrated processing resources that may be located virtually anywhere. That is, the functionality is relocated into a cloud of processing resources handling many different clients, hosted by many different service providers, in many different geographic locations. Improvements in multiple cloud system control will facilitate the further development and implementation of functionality into the cloud.

DETAILED DESCRIPTION

Effectively controlling the operation of computing resources in the cloud is a significant technical challenge. New cloud service providers regularly emerge, each offering different target hosting platforms, supporting disparate services, assets, supported technical components, and other features. The action execution architecture described performs actions on the technical components hosted across multiple different types of target hosting platforms by many different service providers. The action execution architecture provides a centralized, flexible, and extendible mechanism for execution standardized and customized actions against the technical components provisioned with the cloud service providers, regardless of whether any target hosting platform is public or on-premises.

Figure 1:
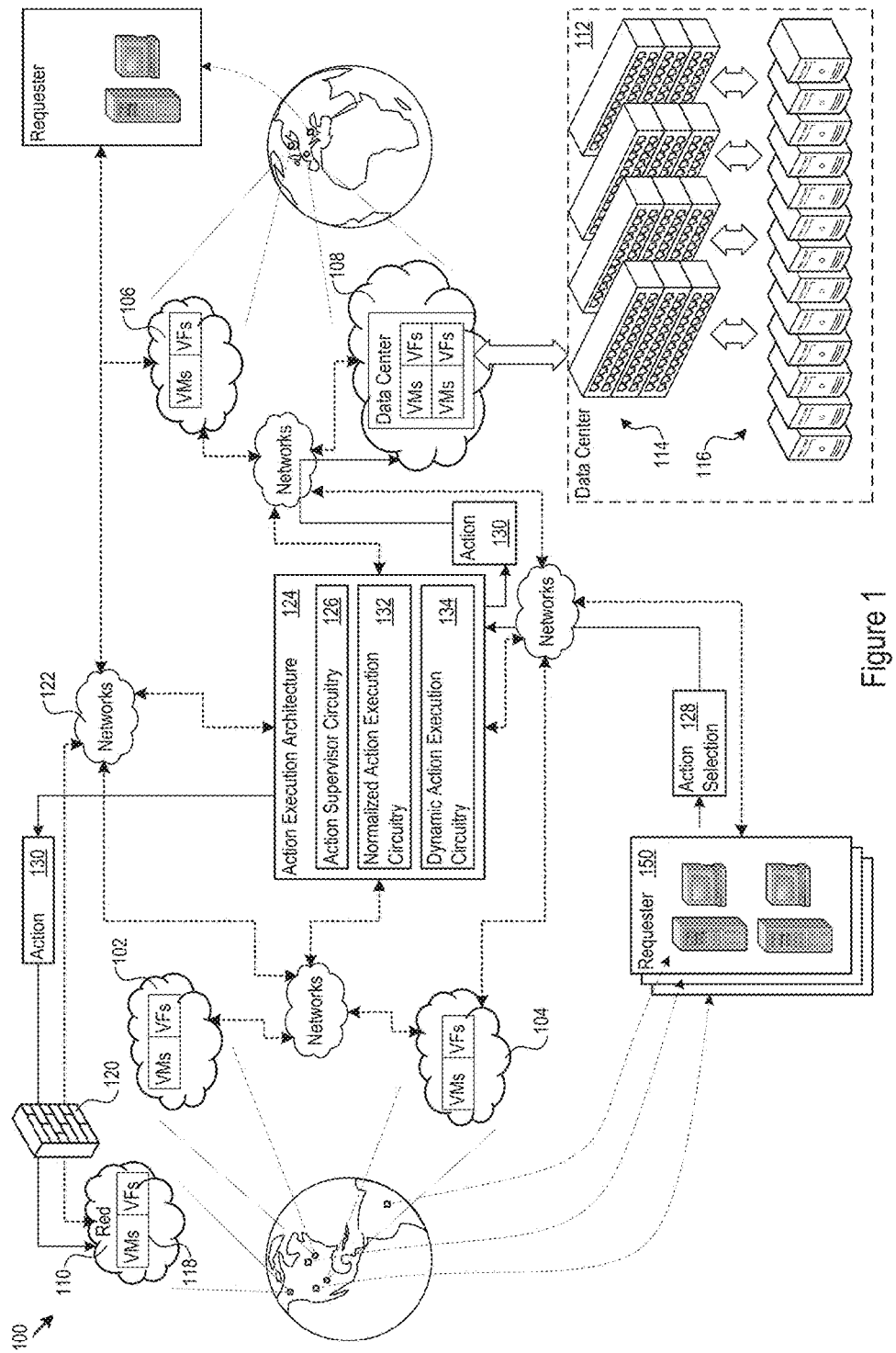
FIG. 1 shows an example of a global network architecture.
Figure 2:
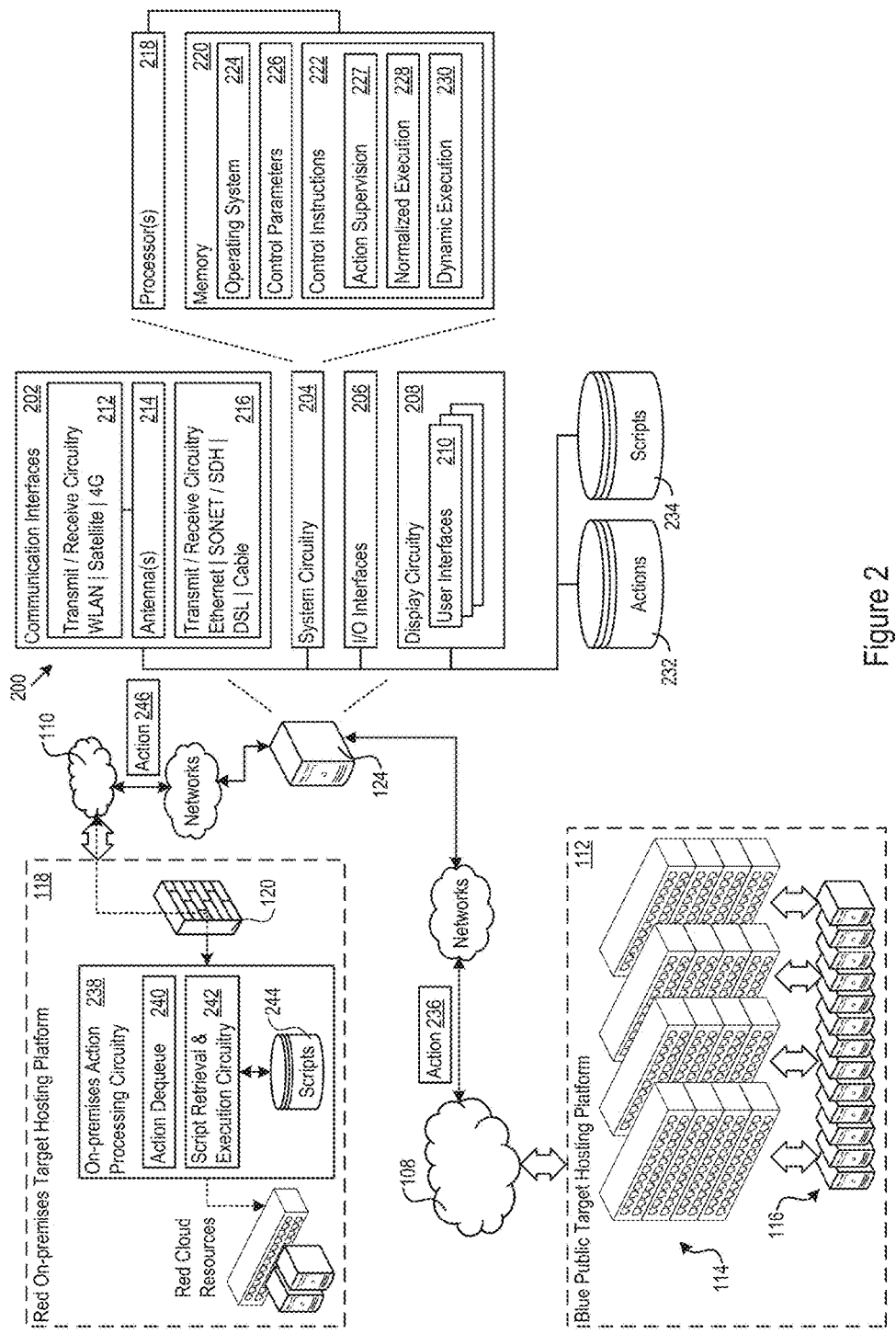
FIG. 2 illustrates an example implementation of a multi-cloud network proxy.

FIGS. 1 and 2 provide an example context for the discussion below of technical solutions to action execution. The examples in FIGS. 1 and 2 show one of many possible different implementation contexts. In that respect, the technical solutions are not limited in their application to the architectures and systems shown in FIGS. 1 and 2, but are applicable to many other cloud computing implementations, architectures, and connectivity.

FIG. 1 shows a global network architecture 100. Distributed through the global network architecture 100 are cloud computing service providers, e.g., the service providers 102, 104, 106, 108, and 110. The service providers may be located in any geographic region, e.g., United States (US) East, US West, or Central Europe. The geographic regions that characterize the service providers may be defined according to any desired distinctions to be made with respect to location. A service provider may provide cloud computing infrastructure in multiple geographic locations. Examples of service providers include Amazon, Google, Microsoft, and Accenture, who offer different target hosting platforms, e.g., Amazon Web Services (AWS), Google Compute Engine (GCE), Microsoft Azure (Azure), Accenture Cloud Platform (ACP), and Windows Azure Pack (WAP) for on-premises cloud implementations, as just a few examples.

Some service providers provide computing resources via hosting platforms that are generally publicly available. Public cloud platforms may refer to, e.g., hosting platforms with shared resources that are reachable and controllable by multiple different clients through the Internet via web browser functionality. For the purposes of discussion below, FIG. 1 shows the Blue service provider 108 providing a (public) Blue target hosting platform 112 in the form of a high capacity data center.

Each service provider has a widely varying set of technical characteristics in the individual target hosting platforms. For instance, FIG. 1 shows that the Blue target hosting platform 112 supports running many different virtual machines (VMs), each potentially running many different virtual functions (VFs). The Blue target hosting platform 112 may include a high density array of network devices, including routers and switches 114, and host servers 116. The host servers 116 support a particular set of computing functionality offered by the Blue service provider 108 from the Blue target hosting platform 112.

As just one of many examples, those host servers 116 in the Blue target hosting platform 112 may support many different types of technical components. Examples of the technical components include different types of virtual machines, differing by number of processors, amount of RAM, and size of disk, graphics processors, encryption hardware, or other properties; multiple different types of web front ends (e.g., different types and functionality for websites); several different types of database solutions (e.g., SQL database platforms); secure data storage solutions, e.g., payment card industry (PCI) data (or any other secure data standard) compliant storage; several different types of application servers; and many different types of data tiers.

Service providers may additionally or alternatively provide computing resources in "on-premises" hosting platforms. An "on-premises" platform may refer to a hosting platform dedicated to a single client, e.g., without resources shared by multiple clients, and with increased privacy and security compared to public cloud resources. An on-premises location may be within a secure facility owned and controlled by a resource requester which has moved computing functionality to a cloud based implementation, for instance. For the purposes of discussion below, FIG. 1 shows the Red service provider 110 providing a Red on-premises Red target platform 118 behind the firewall 120, e.g., within a particular resource requester facility.

Throughout the global network architecture 100 are networks, e.g., the network 122, that provide connectivity within the service providers and between the service providers and other entities. The networks 122 may include private and public networks defined over any pre-determined and possibly dynamic internet protocol (IP) address ranges. An action execution architecture (AEA) 124, described in detail below, facilitates the execution of actions against hosted technical components throughout the cloud space, including in both on-premises and public target hosting platforms.

As an overview, the AEA 124 may include action supervisor circuitry 126. The action supervisor circuitry 126 is configured to, e.g., obtain an action selection 128 of an action 130 to execute against a hosted technical component. The action 130 may be a public cloud action or an on-premises action. The technical components may be, e.g., VMs, database and application servers, networks, disk images, and a wide range of other types, assets, or any other managed resource provisioned in any of the target hosting platforms.

Another aspect of the AEA 124 is the normalized action execution circuitry 132. The normalized action execution circuitry 132 may be configured to, e.g., execute selected actions against hosted technical components. In particular, the normalized action execution circuitry 132 may execute actions defined and validated for multiple different resource requesters. Expressed another way, the normalized action execution circuitry 132 executes actions that have been designed, tested, and validated for applicability to multiple different resource requesters, and that may appear as part of a service catalog available across multiple different resource requesters. Further details of the normalized action execution circuitry 132 are provided below.

The AEA 124 also includes dynamic action execution circuitry 134. The dynamic action execution circuitry 134 is configured to provide a flexible, extendible, and efficient mechanism for not only defining new actions and customized actions, but also executing those actions against both on-premises and public target hosting platforms. The dynamic action execution circuitry 134 solves the technical problem of rapidly creating, deploying, and executing actions, customized for a given resource requester, without incurring the delay, complexity, and cost of the extensive test and validation that may often accompany creating new actions applicable across many resource requesters and carried out by a normalized service catalog.

FIG. 2 shows an example implementation 200 of the AEA 124. The AEA 124 includes communication interfaces 202, system circuitry 204, input/output (I/O) interfaces 206, and display circuitry 208 that generates user interfaces 210 locally or for remote display, e.g., in a web browser running at the resource requester 150. The user interfaces 210 and the I/O interfaces 206 may include graphical user interfaces (GUIs), touch sensitive displays, voice or facial recognition inputs, buttons, switches, speakers and other user interface elements. Additional examples of the I/O interfaces 206 include microphones, video and still image cameras, headset and microphone input/output jacks, Universal Serial Bus (USB) connectors, memory card slots, and other types of inputs. The I/O interfaces 206 may further include magnetic or optical media interfaces (e.g., a CDROM or DVD drive), serial and parallel bus interfaces, and keyboard and mouse interfaces.

The communication interfaces 202 may include wireless transmitters and receivers ("transceivers") 212 and any antennas 214 used by the transmit and receive circuitry of the transceivers 212. The transceivers 212 and antennas 214 may support WiFi network communications, for instance, under any version of IEEE 802.11, e.g., 802.11n or 802.11ac. The communication interfaces 202 may also include wireline transceivers 216. The wireline transceivers 216 may provide physical layer interfaces for any of a wide range of communication protocols, such as any type of Ethernet, data over cable service interface specification (DOCSIS), digital subscriber line (DSL), Synchronous Optical Network (SONET), or other protocol.

The system circuitry 204 may include any combination of hardware, software, firmware, or other logic. The system circuitry 204 may be implemented, for example, with one or more systems on a chip (SoC), application specific integrated circuits (ASIC), microprocessors, discrete analog and digital circuits, and other circuitry. The system circuitry 204 is part of the implementation of any desired functionality in the AEA 124. As just one example, the system circuitry 204 may implement the action supervisor circuitry 126, the normalized action execution circuitry 132, and the dynamic action execution circuitry 134 with one or more instruction processors 218, memories 220, and special purpose control instructions 222.

The memory 220 stores, for example, control instructions 222 and an operating system 224. The processor 218 executes the operating system 224 and the control instructions 222 and to carry out any desired functionality for the AEA 124. The control parameters 226 provide and specify configuration and operating options for the control instructions 222, operating system 224, and other functionality of the AEA 124.

In the example shown in FIG. 2, the AEA 124 includes control instructions 222 that define special purpose instruction sets. The control instructions 222 include action supervision instructions 227 to, e.g., receive an action selection 128 from the resource requester 150 and initiate execution of the action against a hosted technical component. The control instructions 222 also include normalized execution instructions 228 and dynamic execution instructions 230 configured to, e.g., execute selected actions against hosted technical components in public and on-premises target hosting environments, and to provide a mechanism for rapidly creating, deploying, and executing actions, customized for a given resource requester. Further examples of the implementation of the AEA 124 and its system circuitry 204 are given below. In particular, the action supervision instructions 227, normalized execution instructions 228, and dynamic execution instructions 230 may implement, as special purpose control instructions executed by underlying hardware, all or part of the processing described in detail below and with regard to FIGS. 3-12.

The AEA 124 also includes volume storage devices, e.g., hard disk drives (HDDs) and solid state disk drives (SDDs). The storage devices may define and store databases that the control instructions 222 access, e.g., through database control systems, to perform the functionality implemented with the control instructions 222 and processing hardware. In the example shown in FIG. 2, the databases include an actions database 232 and a scripts database 234. As will be described in more detail below, the actions database 232 stores records that define the actions that a resource requester may select for execution against a resource it has deployed into a target hosting environment. The AEA 124 may retrieve, filter, and render the actions for selection in the user interfaces 210 by, as examples, resource, resource requester, region, resource requester user, time, date, subscription status, or any other characteristic. For example, the AEA 124 may display selectable links for the actions that the resource requester 150 may take on a VM running in the Red on-premises target hosting platform 118 by an administrator authorized by the resource requester 150. The scripts database 234 may store instruction sequences (e.g. Powershell, Unix, AppleScript, PHP, or ColdFusion scripts) that define and execute the processing steps that implement an action against a resource in a target hosting platform.

FIG. 2 also shows several of the service providers. Note that the Blue service provider 108 has established the Blue target hosting platform 112 via the data center. For the purposes of discussion below, the Blue target hosting platform 112 is assumed to be a public cloud hosting platform. The AEA 124 executes public cloud actions 236 against the Blue target hosting platform 112 with support from the script database 234.

FIG. 2 also shows an example of the Red on-premises target hosting platform 118. Within the closely controlled environment of the Red on-premises target hosting platform 118, on-premises action processing circuitry 238 selectively executes actions against its provisioned resources. In this example, the on-premises action processing circuitry 238 includes action dequeue circuitry 240 and script retrieval and execution circuitry 242. In addition, an on-premises script database 244 locally stores instruction sequences (e.g., Powershell, Python, Ruby, JavaScript, or Perl scripts) that define and execute the processing steps that implement an on-premises action 246 against a resource within the Red on-premises target hosting platform 118.

Action Execution

Figure 3:
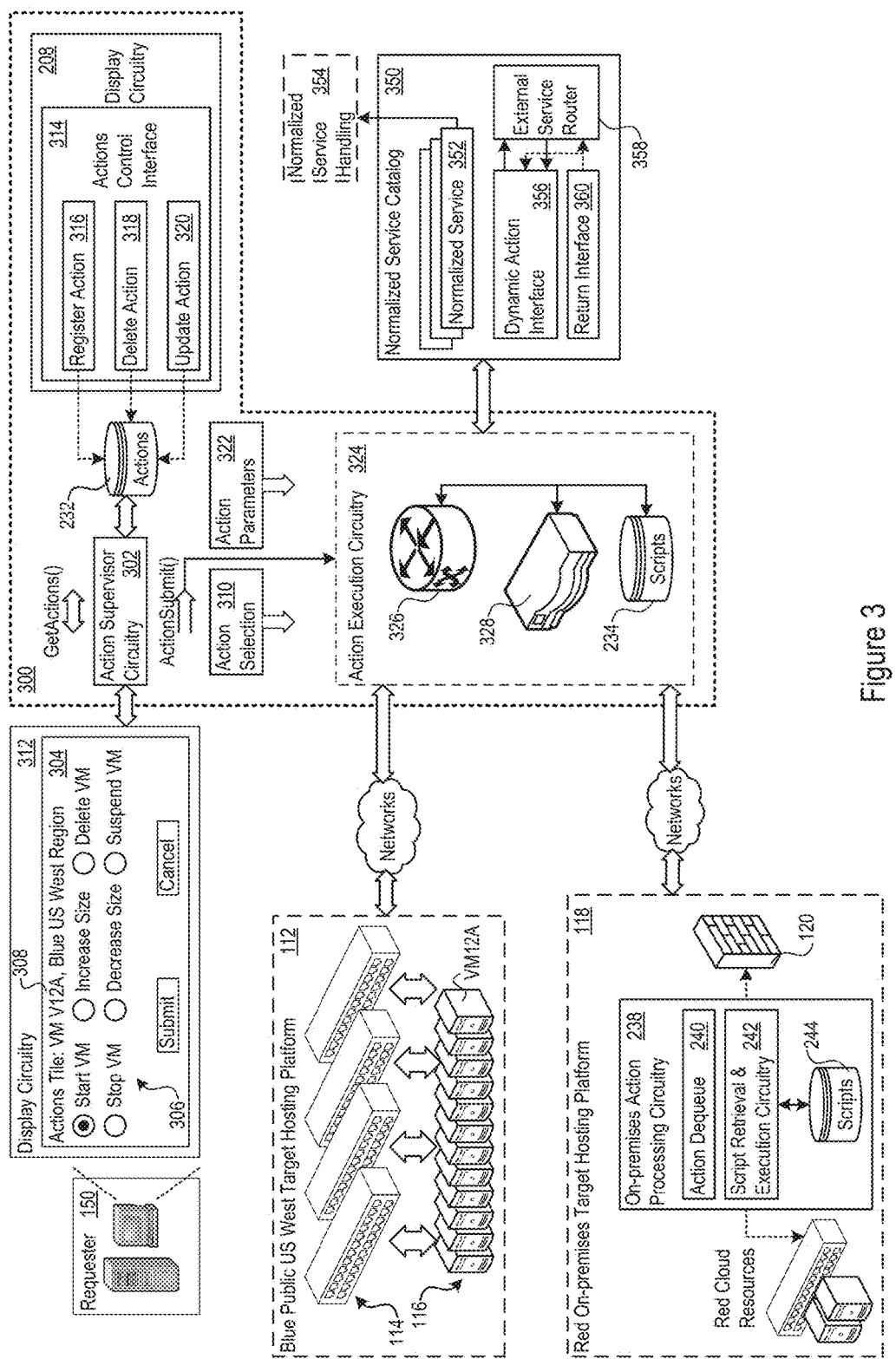
FIG. 3 shows an action execution architecture.

FIG. 3 shows an action execution architecture (AEA) 300, as one example implementation of the AEA 124. The AEA 300 includes action supervisor circuitry 302. In one implementation, the action supervisor circuitry 302 includes an actions application programming interface (API). The actions API defines function interfaces between the AEA 300 and the resource requester 150 for, as examples: generating an action selection interface 304 that specifies available actions 306 to execute against a technical component 308 provisioned in a target hosting platform; communicating the action selection interface 304 to the resource requester 150 that is in control of the technical component; and receive, from the resource requester 150, an action selection 310 of an action to perform against the technical component in the target hosting platform. The resource requester 150 may render the action selection interface 304 using local display circuitry 312.

In this example, the available actions 306 include: Start VM, Stop VM, Increase Size, Decrease Size, Delete VM, and Suspend VM. The available actions 306 are defined in the actions database 232. The actions database 232 may organize the available actions depending on the particular resource, the resource requester, resource requester user/operator, the target hosting platform, target hosting platform subscriber options and permissions, time, date, and many other factors. The action supervisor circuitry 302 searches the actions database 232 to find the actions that apply, and builds the action selection interface 304 to include the available actions.

The action supervisor circuitry 302 may also generate an actions control interface 314. The AEA 300 may render the actions control interface 314 locally using the display circuitry 208, for instance. The action control interface 314 may define, as just three examples: an action registration mechanism 316, through which the AEA 300 may insert new actions into the actions database 232; a delete action mechanism 318, through which the AEA 300 may remove actions from the action database 232; and an update action mechanism 320, through which the AEA may change the configuration of an action, including, e.g., the action parameters for an action.

As will be described in more detail below, the action registration mechanism 316, in conjunction with the flexible script database 234, facilitates dynamic updates to the AEA 300. That is, actions customized for specific resource requesters may be written and inserted into the scripts database 234 and registered in the actions database 232, without incurring the delay, complexity, and cost of the extensive test and validation that may often accompany creating new actions applicable across many resource requesters and carried out by the normalized service catalog 350.

In response to the action selection 310, the action supervisor circuitry 302 may search the action database 232 to determine action parameters 322 for the executing the action. The action supervisor circuitry 302 provides the action selection 310 and the action parameters 322 to the action execution circuitry 324. The action execution circuitry 324 implements multiple different processing paths for an action, depending on the target hosting platform, action, and other factors.

In one implementation, the action execution circuitry 324 includes routing circuitry 326, normalized and dynamic execution circuitry 328, and the scripts database 234. The routing circuitry 326 may make a processing determination of whether to process the action along, e.g., a normalized service path, an on-premises dynamic service path, or a public dynamic service path. The routing circuitry 326 may make the processing determination responsive to the target hosting platform (e.g., on-premises vs. public) and the action itself, or other factors in addition or in the alternative, including the action selection 310 and the action parameters 322. As a specific example, the routing circuitry 326 may make the routing decision based upon, e.g., an action identifier or action parameter received with the action selection 310 or in the action parameter 322, and a routing table of identifiers and parameters to destinations configured in the routing circuitry 326.

When the processing determination is the normalized service path itself, the normalized and dynamic execution circuitry 328 submits the action selection to a normalized service interface 352 in the normalized service catalog 350. The normalized service interface 352 processes actions that are pre-defined in the normalized service catalog 350 according to pre-established normalized service handling 354. The normalized service interface 352 may be reserved for those actions that are already defined, tested, validated, and implemented across multiple different target hosting environments, and that are now processed by the normalized service catalog 350.

In one implementation, the Cisco Prime Service Catalog (CPSC) implements the normalized service catalog, including service aspects such as SLA control, error control, action execution tracking, reporting, action execution, the normalized service handling 354, external service router 358 (e.g., via Cisco Service Link), return interface 360, and other features. Expressed another way, the normalized service catalog 350 provides an additional (with respect to the action execution circuitry 324) automation engine or service orchestration engine through which pre-defined standardized actions may be executed against resources. The normalized service catalog 350 may be an established or pre-existing service catalog mechanism that handles pre-defined standardized actions. In one aspect, the AEA extends the normalized service catalog 350 to provide more flexible and dynamic definition and execution of actions for public and private target hosting platforms.

The normalized and dynamic execution circuitry 328, when the processing determination is the public dynamic service path, submits the action selection and action parameters to a dynamic action interface 356 in the normalized service catalog 350, even though the normalized service catalog 350 is along the normalized service path. In fact, the dynamic action interface 356 facilitates handling the action instead by the action execution circuitry 324, while at the same time obtaining the benefits of the service aspects of the established normalized service catalog 350. That is, the dynamic action interface 356 assumes that the action execution circuitry 324 implements its own processing for the action. As just one example, the dynamic action interface 356 may be configured to receive a message including the action selection 310 and action parameters 322, and trigger the service aspects noted above that are implemented in the normalized service catalog 350. The message may identify the action as subject to processing by the dynamic action interface 356, as opposed to processing as a normalized service via the normalized service interface 352.

The dynamic action interface 356 delivers the action selection 310 and action parameters 322 to the external service router 358. The external service router 368 is configured to forward the action selection 310 and action parameters 322 to an external service for processing, which may be specified in the wrapper message, or pre-configured for the requests received from the dynamic action interface 356. As will be described in more detail below, in this particular implementation the external service router 368 forwards the action selection 310 and action parameters 322 back to the action execution circuitry 324.

That is, the normalized and dynamic execution circuitry 328 is configured to, when the processing determination is the public dynamic service path, receive the action selection in return from the normalized service catalog 350 and locally queue the action selection in a public action queue. The normalized and dynamic execution circuitry 328 retrieves the action selection 310 from the public action queue, and searches an action definition memory, such as the script database 234, to locate an instruction sequence that defines processing steps that implement the action. The normalized and dynamic execution circuitry 328 executes the instruction sequence to carry out the action on the public target hosting platform, e.g., the Blue target hosting platform 112 shown in FIG. 3.

For the on-premises dynamic service path, the normalized and dynamic execution circuitry 328 configures a private action queue for remote communication with a specific on-premises target hosting platform assigned to the private action queue. For instance, the private action queue may be assigned to the red on-premises target hosting platform 118. The configuration permits the on-premises target hosting platform to check for and retrieve the action selection from the private action queue, and remotely execute the action in the specific on-premises target hosting platform. That is, the on-premises target hosting platform executes the action inside of its secure environment, instead of having the action execution circuitry 324 execute the action by reaching into the on-premises target hosting platform and executing processing steps.

For both the on-premises dynamic service path and the public dynamic service path, the action execution circuitry 324 includes a response interface. The response interface is configured to receive an action execution response from the target hosting platform and submit the action execution response to the normalized service catalog 350, e.g., via the return interface 360, for tracking execution of the action. Submitting the action execution response closes the loop for driving the service aspects pre-established within the normalized service catalog 350, e.g., SLA control, error reporting, and action execution reporting.

Expressed another way, the AEA 300 generates an action selection interface 304 specifying available actions 306 to execute against a resource provisioned in a target hosting platform, obtains an action selection 310 of an action from among the available actions to execute against the resource provisioned in the target hosting platform, and obtains action parameters 322 for executing the action. The AEA 300 also chooses, responsive to the target hosting platform, a selected execution path from among multiple pre-defined execution paths that provide action execution options in the action execution system. Described below as examples are multiple pre-defined execution paths including a normalized service path, an on-premises dynamic service path, and a public dynamic service path. The AEA 300 routes the action selection for processing along the selected execution path.

Figure 4:
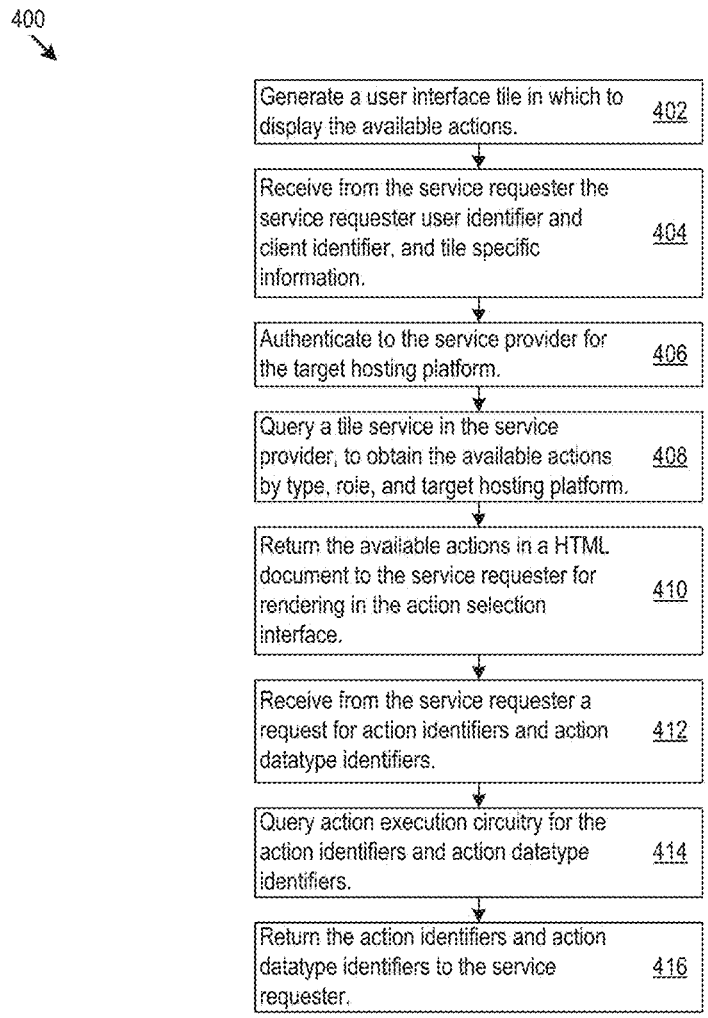
FIG. 4 shows a logical flow for determining available actions for resource types deployed in a target hosting environment.

FIG. 4 shows a logical flow 400 that may be implemented in the AEA 300, e.g., in the action supervisor circuitry 302, for determining available actions for resource types deployed in a target hosting environment and generating the action selection interface 304. The logical flow 400 includes generating a user interface tile in which to display the available actions (402). The logical flow 400 then loads the action tile with available actions. In that respect, the logical flow 400 may receive, from the resource requester 150, the resource requester user identifier and client identifier, and tile-specific information such as service and environment metadata describing the service provider, user roles, target hosting platform identifier, and resource type against which the resource requester will request an action (404).

The logical flow 400 then authenticates to the service provider for the target hosting platform using the information obtained from the resource requester 150 (406). The logical flow 400 queries, e.g., a tile service in the service provider, to obtain the available actions by type, role, and target hosting platform (408). The tile service may obtain the available actions by querying the actions database 232 which may be maintained at the service provider, at the AEA 300, or at other locations. The logical flow 400 may return the available actions, e.g., in a hypertext markup language (HTML) document to the resource requester 150 for rendering in the action selection interface 304 (410).

For each of the available actions, the resource requester 150 may also request action identifiers that identify the action, and action datatype identifiers that identify the action parameters. The logical flow receives the request (412). Many different locations may store and maintain the action identifiers and action datatype identifiers, e.g., in a database. In different implementations, the action identifiers and action datatype identifiers may be maintained, as examples, in the normalized service catalog 350, the actions database 232 itself, or within the action execution circuitry 324. The logical flow 400 queries the location for the action identifiers and action datatype identifiers for each available action (414), and returns them to the resource requester 150. Accordingly, the resource requester 150 may accept inputs through the action selection interface 304 of specific actions, and action parameters. As one specific example, the resource requester 150 may receive a selection of a 'Start VM' action, with an action parameter specifying a time at which to start the VM. The resource requester 150 sends the action and the parameters as the action selection 310 and the action parameters 322.

Figure 5:
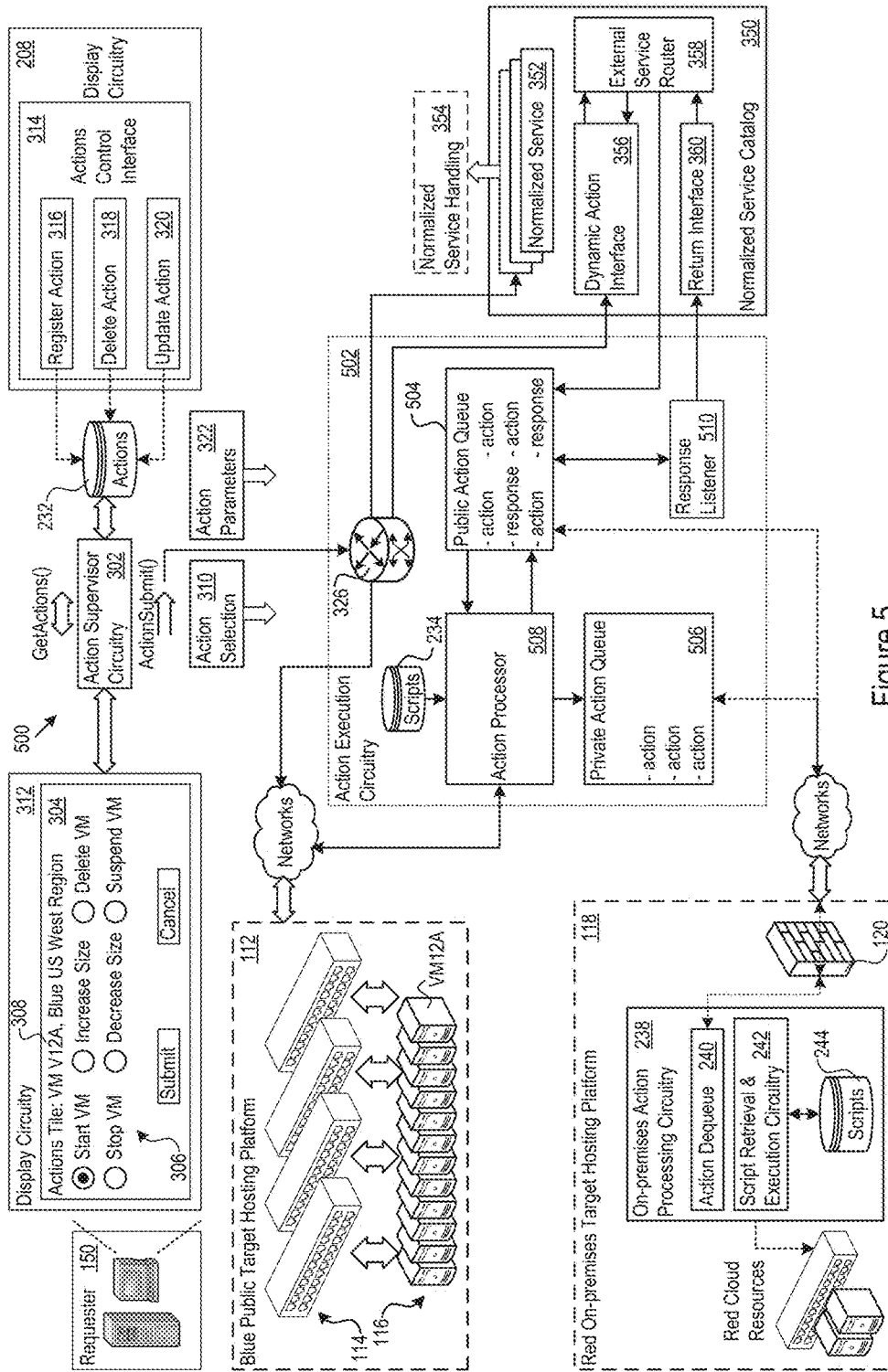
FIG. 5 shows a particular implementation of an action execution architecture.

FIG. 5 shows another example of an action execution architecture (AEA) 500, including another implementation example of action execution circuitry 502. In the example of FIG. 5, the routing circuitry 326 in the action execution circuitry 502 may make a processing determination of whether to process a given action along different service paths, such as a normalized service path, an on-premises dynamic service path, or a public dynamic service path. As noted above, the routing circuitry 326 may make the processing determination responsive to the target hosting platform (e.g., on-premises vs. public) and the action itself, or other factors.

The action execution circuitry 502 includes a public action queue 504 and a private action queue 506. The public action queue 504 and private action queue 506 may be implemented with an Azure service bus or other queuing mechanism. The action execution circuitry 502 also includes an action processor 508 and a response listener 510. The public action queue 504 stores actions with action parameters to execute against public target hosting platforms. The public action queue 504 also stores action execution responses (e.g., completion messages, error messages, status messages, and the like) that result from execution of the actions. In the implementation shown in FIG. 5, the public action queue 504 buffers action execution responses from both public target hosting platforms and on-premises target hosting platforms.

The response listener 510 monitors the public action queue for action execution responses. When the response listener 510 finds an action execution response, the response listener 510 pulls the action execution response from the public action queue, and submits the action execution response to the normalized service catalog 350 for tracking execution of the action along both the public dynamic service path and the on-premises dynamic service path. The response listener 510 may submit the response to the normalized service catalog 350 via the return interface 360, for example. The return interface 360 may include representational state transfer APIs and Java stubs (e.g., via the CPSC nsAPI) configured to provide access to entities defined in the normalized service catalog 350.

The AEA 500 configures the private action queue 506 for remote communication with a specific on-premises target hosting platform assigned to the private action queue 506. In the example of FIG. 5, the private action queue 506 is a tenant specific queue for the red on-premises target hosting platform 118. As such, the action dequeue circuitry 240 in the red on-premises target hosting platform 118 has access rights to check for and retrieve the actions and action parameters locally queued in the private action queue 506 on any pre-determined schedule. The script retrieval and execution circuitry 242 in the red on-premises target hosting platform 118 searches the local on-premises script database 244 to find the script that implements the action. The script retrieval and execution circuitry 242 then remotely executes (with respect to the AEA 500) the action in the red on-premises target hosting platform 118, instead of in the AEA 500.

The action processor 508 may be implemented as, e.g., a Windows™ service running on the .NET platform, or as an Azure web job. The action dequeue circuitry 240 and script retrieval and execution circuitry 242 may be implemented with the same technologies. The action processor 508 monitors the public action queue for actions to execute against public target hosting platforms and on-premises target hosting platforms.

For on-premises target hosting platforms, the action processor 508 inserts the action and action parameters into the specific private action queue 506 (of which there may be many) for the particular on-premises target hosting platform in which the action will execute. For public target hosting platforms, the action processor 508 searches an action definition memory, such as the script database 234, to locate an instruction sequence that defines processing steps that implement the action. The action processor 508 then locally executes the instruction sequence within the action execution system against the public target hosting platform. The action processor 508 may execute the instruction sequence by, e.g., by connecting to the public target hosting platform and issuing instructions to perform, according to the instruction sequence, to the public target hosting platform.

Implementations may vary significantly from one instantiation of the AEA to another. With respect to FIG. 5 and as one example, the normalized action execution circuitry 132 may include the routing circuitry 326 to direct action and action parameters to the normalized service interface 352, while relying on an independent entity to provide the normalized service interface 352. In other implementations, the normalized action execution circuitry 132 may include an implementation of the normalized service interface 352 and service orchestration engine that implements the normalized service handling 354.

Again with respect to FIG. 5, the dynamic action execution circuitry 134 may include the routing circuitry 326 and public action queue 504. When on-premises target hosting platforms are supported, the dynamic action execution circuitry 134 may also include the private action queue 506. The dynamic action execution circuitry 134 may also include the action processor 508 and the response listener 510. Further, the dynamic action execution circuitry 134 may include the scripts database 234 that stores the instruction sequences for executing actions against public target hosting platforms. The dynamic action execution circuitry 134 may rely on an independent entity to provide the dynamic action interface 356, return interface 360, and external service router 358, or may implement any or all of these features itself. In one sense, the dynamic action execution circuitry 134 is dynamic in that it avoids the delay, complexity, and cost of the extensive test and validation that may often accompany creating new actions applicable across many resource requesters and carried out by the normalized service catalog 350. The actions supported by the dynamic action execution circuitry 134 may therefore be deployed much more rapidly, with new instruction sequences written into the scripts database 234 for a particular target hosting platform and new action, and registration of the new action into the action database via the action registration mechanism 316.

Execution Paths

Figure 6:
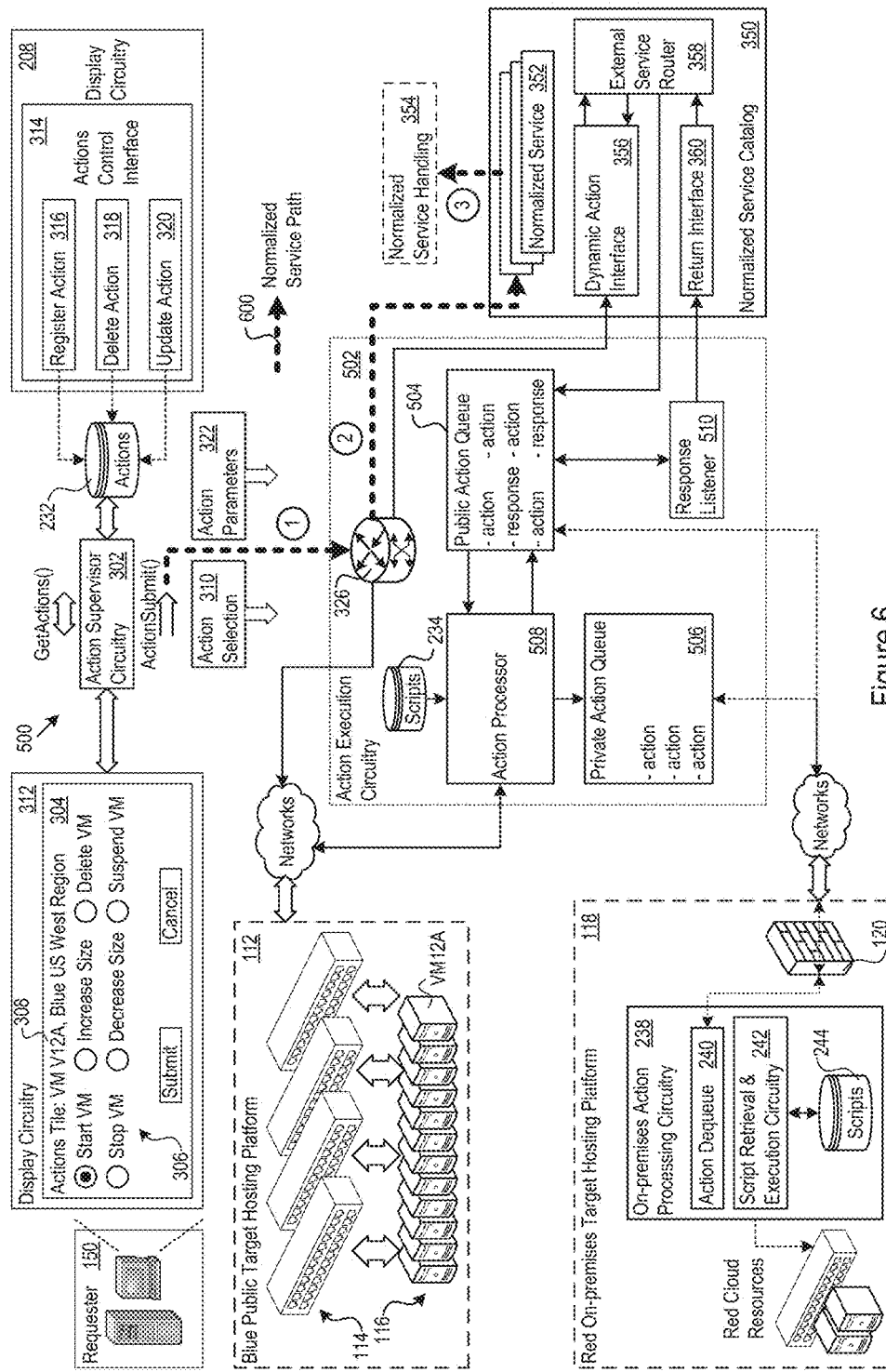
FIG. 6 shows an action execution architecture for normalized service path actions.
Figure 7:
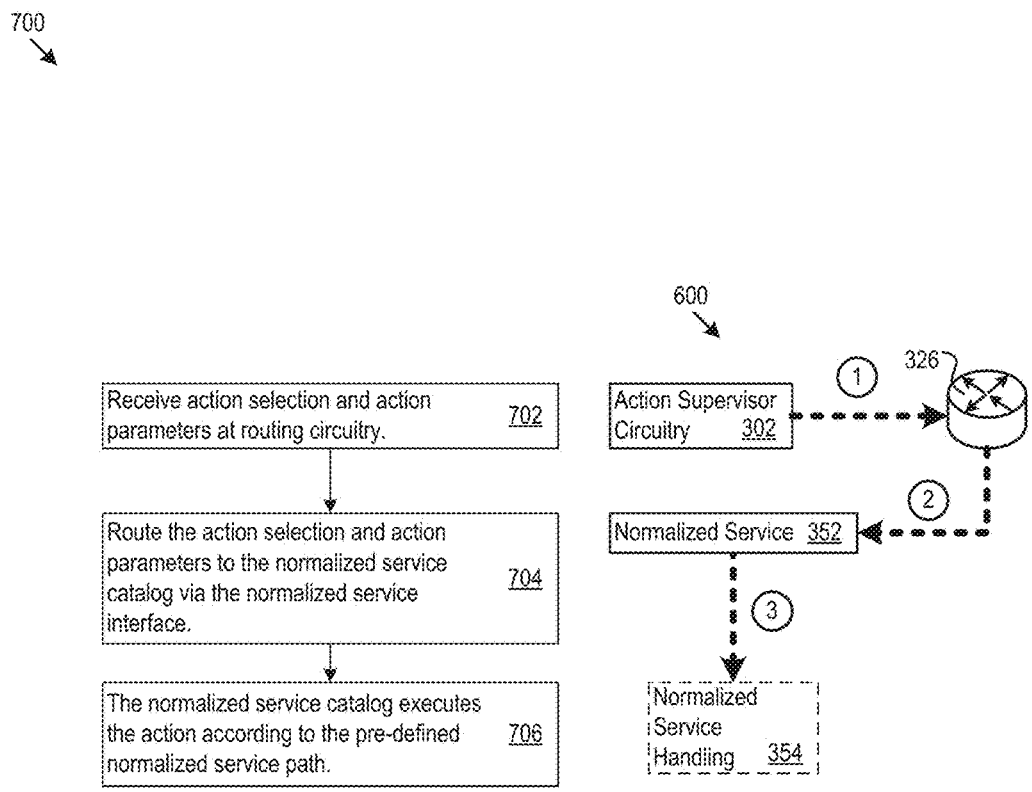
FIG. 7 shows a logical flow for normalized service path actions.

FIG. 6 shows a normalized service path 600 in the AEA 500. FIG. 7 shows a corresponding logical flow 700. The normalized service path 600 processes normalized service path actions. More specifically, the normalized service path 600 is taken by actions that the normalized service catalog 350 processes using the normalized service handling 354.

On the normalized service path 600, action supervisor circuitry 302 delivers the action selection 310 and action parameters 322 to the routing circuitry 326 (702). The routing circuitry 326 submits the action selection 310 and action parameters 322 to the normalized service catalog 350 via the normalized service interface 352 (704). The routing circuitry 326 may make the routing decision as described above, e.g., based upon an action identifier received with the action selection 310 and a routing table of identifiers to destinations configured in the routing circuitry 326. In this scenario, the action is pre-defined within the normalized service catalog 350, and the normalized service catalog 350 may execute the action according to the pre-defined normalized service handling 354 (706).

Figure 8:
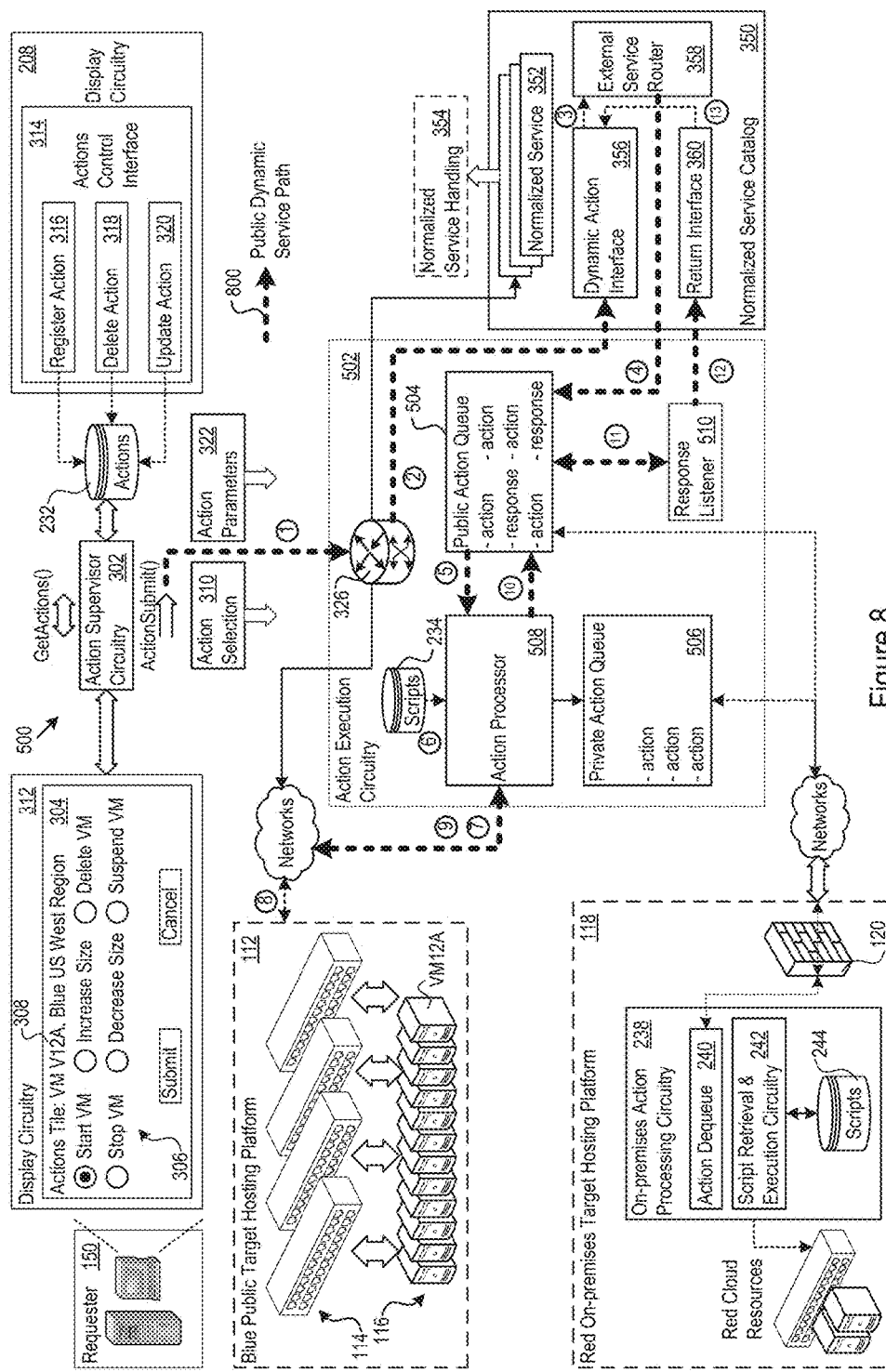
FIG. 8 shows an action execution architecture for public dynamic service path actions for public target hosting environments.
Figure 9:
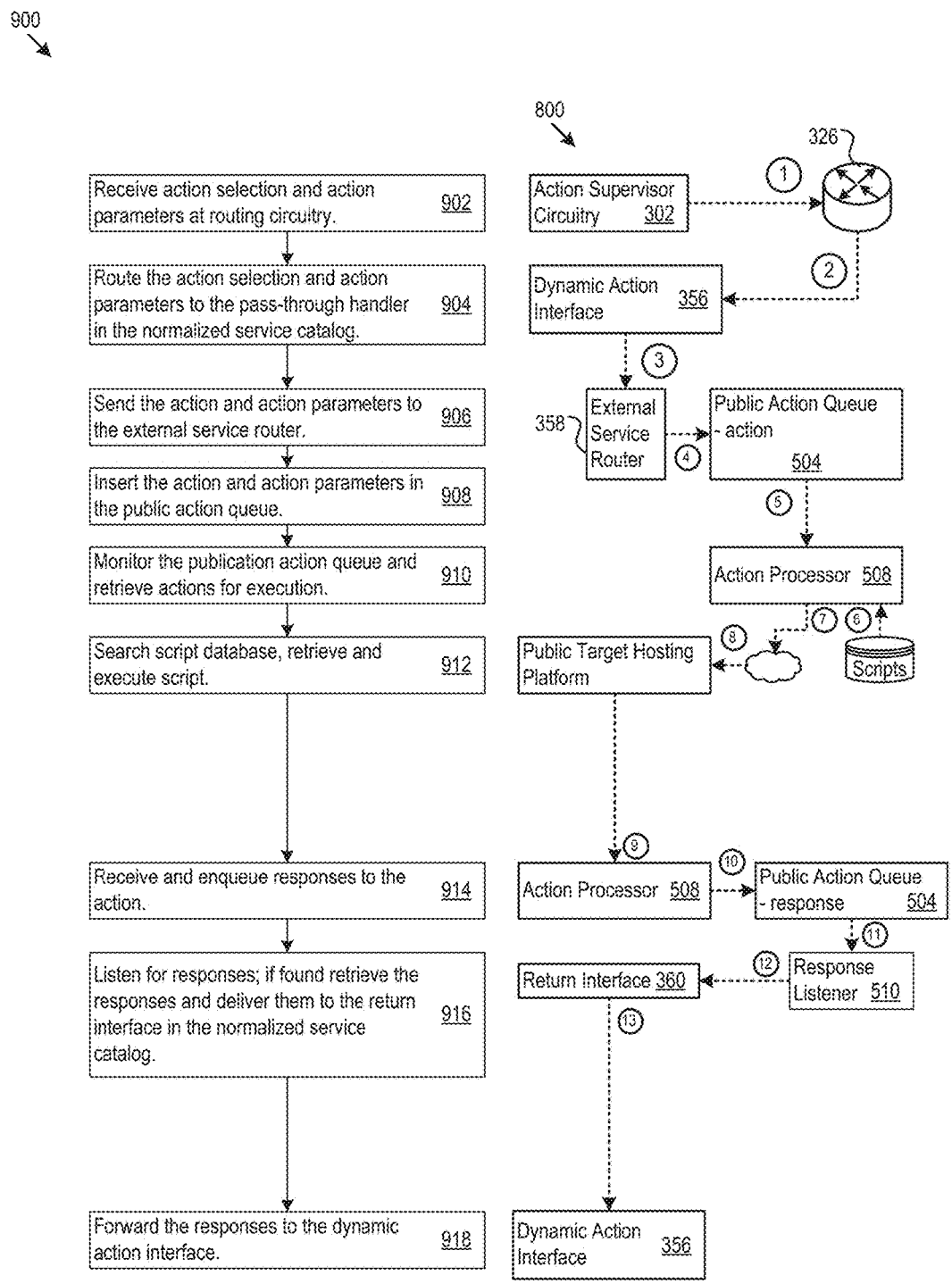
FIG. 9 shows a logical flow for public dynamic service path actions for public target hosting environments.

FIG. 8 shows a public dynamic service path 800 in the AEA 500. FIG. 9 shows a corresponding logical flow 900. The public dynamic service path 800 processes public dynamic service path actions for public target hosting environments. More specifically, the public dynamic service path 800 is taken by actions that the action execution circuitry 502 processes.

On the public dynamic service path 800, action supervisor circuitry 302 delivers the action selection 310 and action parameters 322 to the routing circuitry 326 (902). The routing circuitry 326 submits the action selection 310 and action parameters 322 to the dynamic action interface 356 in the normalized service catalog 350 (904). The action uses the dynamic action interface 356 to choose which path to follow for processing. In that respect, the dynamic action interface 356 may be implemented (and appear to the action and routing circuitry 326) as another service implemented in the normalized service catalog 350. However, unlike the normalized services 352, the dynamic action interface 356 is configured to pass the action it receives to an external handler through the external service router 358. In other words, when the action is one handled externally with respect to the normalized service catalog 350, the routing circuitry 326 invokes the service defined by the dynamic action interface 356, which in turn passes the action selection 310 and action parameters 322 to the external service router 358 (906). The external service router 358 is pre-configured to invoke an external service, and in this case, is pre-configured to pass the action selection 310 and action parameters 322 back to the action execution circuitry 502. More specifically, the external service router 358 passes the action selection 310 and the action parameters 322 to the public action queue 504 for insertion (908).

The action processor 508 monitors the publication action queue 504 and retrieves actions and action parameters for execution (910). The action processor 508 searches the script database 234 for a script that implements the action, then retrieves and executes the script (912). One result is that the action processor 508 issues instructions to the public target hosting platform directly, e.g., to the blue target hosting platform 112.

The action processor 508 may also receive and enqueue responses to the action (914). Responses may arrive from the public target hosting platform, or may be generated by the action processor 508 itself as it executes the instruction sequence that implements the action. Examples of responses include: success and failure status of the action and the individual instructions that compose the action, the current status of execution of the action, and information generated by the target hosting platform or action processor 508 in connection with the action (e.g., total number of VMs now running in response to starting a new VM).

The response listener 510 listens for responses. If any are found, the response listener 510 retrieves the responses and delivers them to the return interface 360 in the normalized service catalog 350 (916). The return interface 360 may be implemented as an API, e.g., in the normalized service catalog 350. As one specific implementation example, the return interface may be the nsAPI provided by CPSC, or a separate listener component that provides an API for responding to actions taken by the external service router 358. The return interface 360 may be implemented in several different ways, including as a component of the dynamic action interface 356, a component of the external service router 358. That is, the response listener 510 may call the return interface 360 to deliver the responses (e.g., completion or failure messages) to the normalized service catalog 350. In turn, the return interface 360 delivers the responses to the dynamic action interface 356 for the action (918). The dynamic action interface 356 acts as a pass-through mechanism (through the external service router 358) to have the action performed by the action execution circuitry 502. However, because the dynamic action interface 356 exists in the normalized service catalog 350, the service aspects provided by the normalized service catalog 350 are made available to the dynamic action interface 356 for application to the externally handled action. As such, as one example, the normalized service catalog 350 may define and apply SLAs to execution of the action that the normalized service catalog 350 tracks and applies responsive to submission of the action through the dynamic action interface 356 and responsive to the responses returned through the return interface 360.

Figure 10:
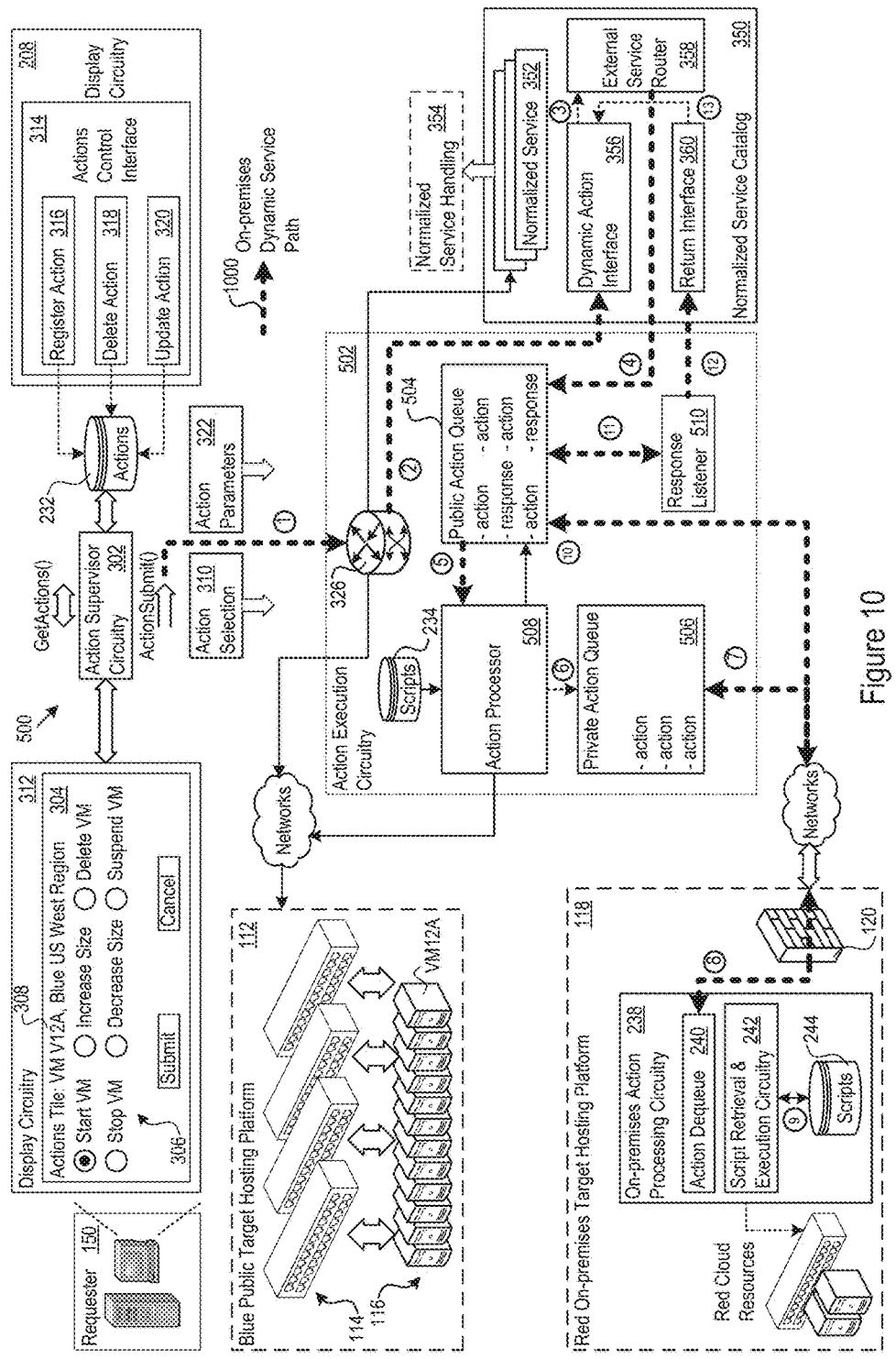
FIG. 10 shows an action execution architecture for on-premises dynamic service path actions for on-premises target hosting platforms.
Figure 11:
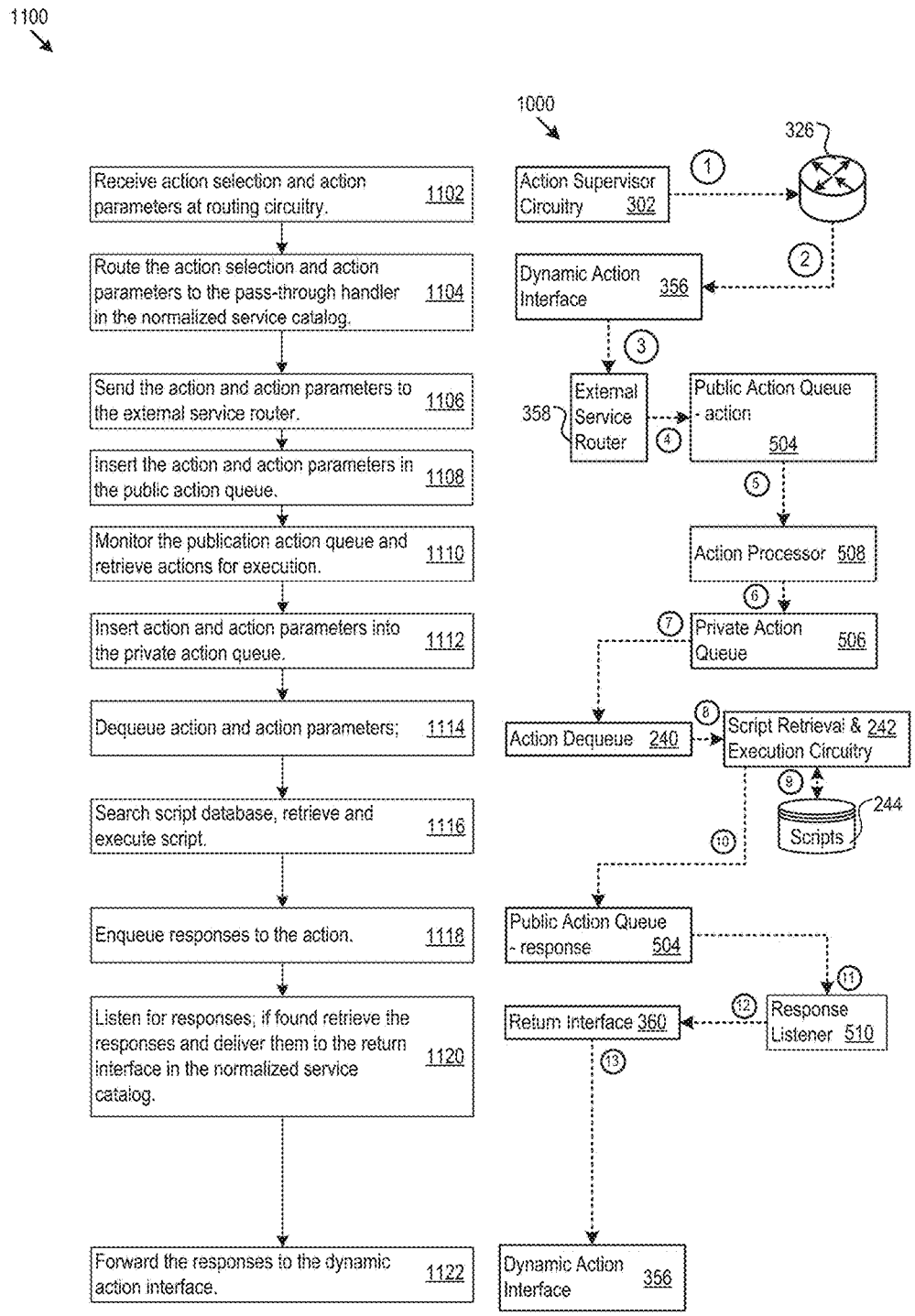
FIG. 11 shows a logical flow for on-premises dynamic service path actions for on-premises target hosting platforms.

FIG. 10 shows an on-premises dynamic service path 1000 in the AEA 500. FIG. 11 shows a corresponding logical flow 1100. The on-premises dynamic service path 1000 processes on-premises dynamic service path actions for private/on-premises target hosting environments. More specifically, the on-premises dynamic service path 1000 is taken by actions that on-premises action processing circuitry processes within an on-premises target hosting platform. In the example in FIG. 10, the on-premises action processing circuitry 238 processes the action in the red on-premises target hosting platform 118.

For the on-premises dynamic service path 1000, the action supervisor circuitry 302 delivers the action selection 310 and action parameters 322 to the routing circuitry 326 (1102). The routing circuitry 326 submits the action selection 310 and action parameters 322 to the dynamic action interface 356 in the normalized service catalog 350 (1104). The dynamic action interface 356 passes the action selection 310 and action parameters 322 to the external service router 358 (1106). The external service router 358 is pre-configured to invoke an external service, and in this case, is pre-configured to pass the action selection 310 and action parameters 322 back to the action execution circuitry 502. More specifically, the external service router 358 passes the action selection 310 and the action parameters 322 to the public action queue 504 for insertion (1108).

The action processor 508 monitors the publication action queue 504 and retrieves actions and action parameters for execution (1110). Note however that in this instance, the action processor 508 recognizes the action as one that should be executed in an on-premises target environment, and does not search the script database 234 for a script that implements the action. Instead, the action processor 508 inserts the action and action parameters into the private action queue 506 (1112).

The action dequeue circuitry 240 queries the private action queue 506 on any predetermined schedule. When the action dequeue circuitry 240 finds a pending action, it retrieves the action and action parameters and submits the action to the script retrieval and execution circuitry 242 (1114). The script retrieval and execution circuitry 242 searches the on-premises script database 244 for a script that implements the action, then retrieves and executes the script (1116). In this manner, the script retrieval and execution circuitry 242 issues instructions to the on-premises target hosting platform from within that platform, and not under direct control of the action execution circuitry 502.

The script retrieval and execution circuitry 242 generates and enqueues responses to the action (1118). The response listener 510 listens for responses. If any are found, the response listener 510 retrieves the responses and delivers them to the return interface 360 in the normalized service catalog 350 (1120), e.g., by directly calling an API in the return interface 360 as explained above with regard to FIG. 8. In turn, the return interface 360 delivers the responses to the dynamic action interface 356 for the action (1122). In other implementations, the response listener 510 delivers responses to the external service router 358, which in turn delivers the responses to the dynamic action interface 356.

With on-premises actions, the dynamic action interface 356 again acts as a pass-through mechanism (through the external service router 358) to have the action ultimately performed on-premises. As noted above, because the dynamic action interface 356 exists in the normalized service catalog 350, the service aspects provided by the normalized service catalog 350 are available to the dynamic action interface 356. That is, the AEA 500 provides the service aspects available from the normalized service catalog 350, while facilitating execution of actions generated in a more dynamic manner against both public and on-premises target hosting platforms.

Figure 12:
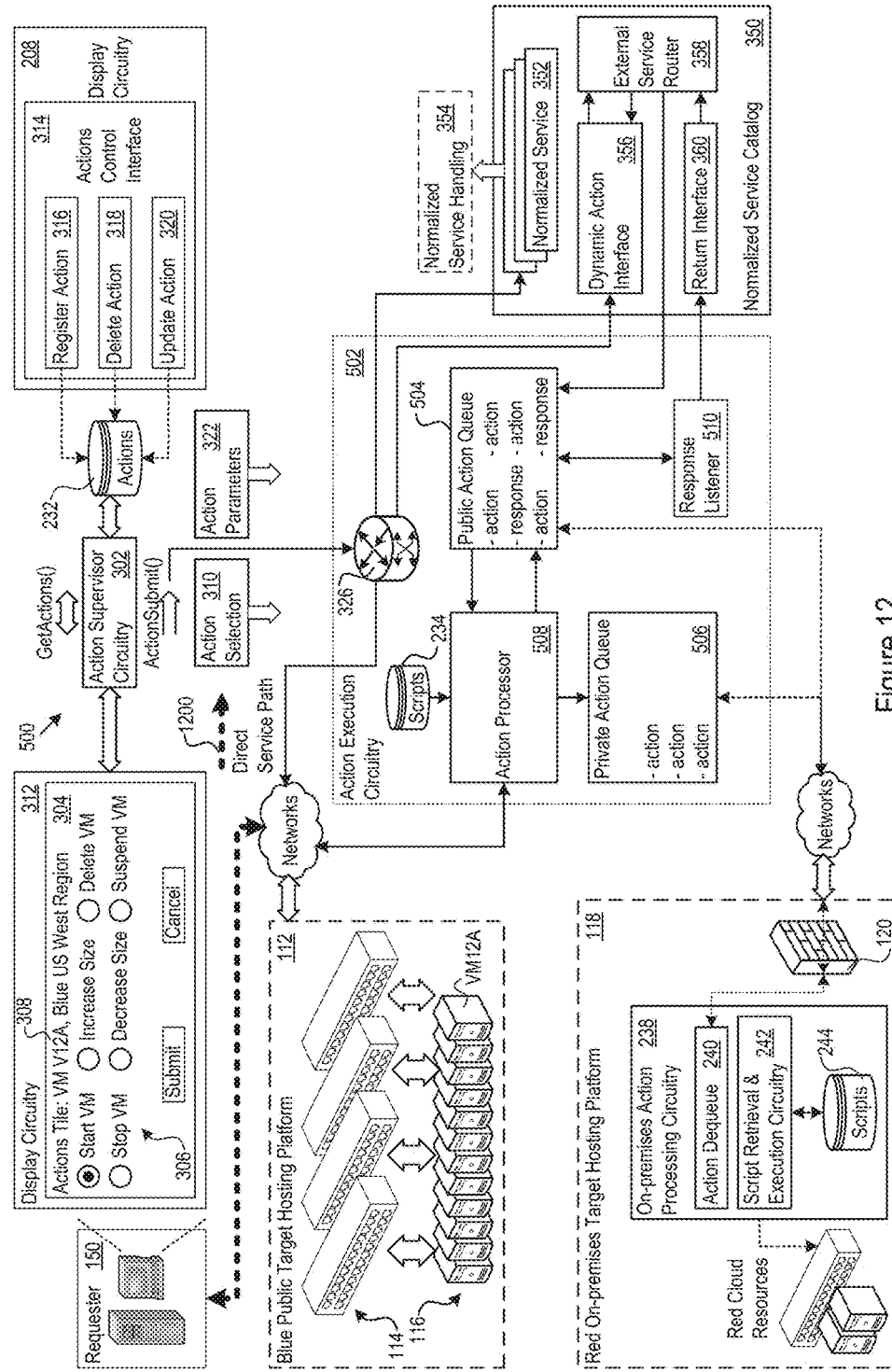
FIG. 12 shows an action execution architecture for a direct execution service path for public target hosting platforms.

Other embodiments of the AEAs may implement additional, different, or fewer execution paths. For instance, another implementation of the AEA may include a direct execution path from the resource requester to a public target hosting platform. FIG. 12 shows an example of such an AEA, and the direct execution service path 1200. In this execution path scenario, the resource requester 150 includes its own action processing circuitry and may follow instruction sequences to implement actions directly against the public target hosting platform, without passing the action and action parameters to a separate AEA.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and controlled, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

What is claimed is:

1. A system, comprising:
an action supervisor circuitry including a hardware processor, the action supervisor circuitry configured to:
accept an action selection of an action to perform against a virtual machine provisioned in a target hosting platform, and
accept action parameters for executing the action;
a routing circuitry including the hardware processor, the routing circuitry configured to facilitate execution of the action responsive to the target hosting platform by:
determining whether the target hosting platform is a public target hosting platform or an on-premises target hosting platform;
responsive to determining that the target hosting platform is the public target hosting platform, make an action execution selection from among multiple different public target hosting platform action execution options, wherein the multiple different public target hosting platform action execution options include: selecting a normalized service path option when the action to be performed is within a predetermined set of actions that are already defined and validated across multiple different target hosting environments, and selecting a dynamic service path option when the action to be performed is not within the predetermined set of actions;
responsive to determining that the target hosting platform is the on-premises target hosting platform, locally queue the action parameters in a private action queue in communication with the on-premises target hosting platform, wherein the private action queue configured to be remotely reachable by the on-premises target hosting platform to check for and retrieve the action parameters from the private action queue;
a dynamic action execution circuitry including the hardware processor, the dynamic action execution circuitry configured to initiate execution of the action when the dynamic service path option is selected;
a response listener circuitry including the hardware processor, the response listener circuitry configured to:
listen for an action execution response from the public target hosting platform or the on-premises target hosting platform; and
a response interface circuitry including the hardware processor, the response interface circuitry configured to:
receive the action execution response from the target hosting platform, and
submit the action execution response to a normalized service catalog for tracking execution of the action for both a public dynamic service path and an on-premises dynamic service path.

2. The system of claim 1, further comprising: a script database comprising an instruction sequence that defines processing steps that implement the action.

3. The system of claim 2, further comprising:
a public action queue; and where: the action is configured to place the action parameters in the public action queue when the target hosting platform is a public hosting platform.

4. The system of claim 3, where:
the dynamic action execution circuitry is further configured to:
retrieve the action parameters from the public action queue; and
execute the instruction sequence.

5. The system of claim 4, where:
the dynamic action execution circuitry is further configured to:
queue an action execution response in the public action queue.

6. The system of claim 5, where:
the response listener circuitry further configured to:
dequeue the action execution response; and
submit the action execution response to a response interface of an action tracking system.

7. The system of claim 1, where:
the routing circuitry is configured to submit the action parameters to the normalized service catalog for execution of the action along the normalized service path option,
when the multiple different target hosting platform action execution options comprises the normalized service path option.

8. The system of claim 1, further comprising:
a public action queue; and
a script database comprising an instruction sequence that defines processing steps that implement the action; and
where: the routing circuitry is configured to indirectly place the action parameters in the public action queue by first passing them to a dynamic action interface along the normalized service path option, when the multiple different target hosting platform action execution options comprises the dynamic service path option; and
the dynamic action execution circuitry is further configured to:
retrieve the action parameters from the public action queue, and
execute the instruction sequence.

9. A method, comprising:
in an action execution system:
generating, by an action supervisor circuitry including a hardware processor, an action selection interface specifying available actions to execute against a virtual machine provisioned in a target hosting platform;
obtaining, by the action supervisor circuitry including the hardware processor, an action selection of an action from among the available actions to execute against the virtual machine provisioned in the target hosting platform; and
obtaining, by the action supervisor circuitry including the hardware processor, action parameters for executing the action;
determining, by a routing circuitry including the hardware processor, whether the target hosting platform is a public target hosting platform or an on-premises target hosting platform;
choosing, by the routing circuitry including the hardware processor, a selected execution path from among multiple pre-defined execution paths in the action execution system, the multiple pre-defined execution paths comprising: a normalized service path, an on-premises dynamic service path, and a public dynamic service path;
routing, by the routing circuitry including the hardware processor, the action selection to the selected execution path;
choosing, by the routing circuitry including the hardware processor, the normalized service path when the action is within a predetermined set of actions that are already defined and validated across multiple different target hosting environments and when the action is a public cloud action;
choosing, by the routing circuitry including the hardware processor, the public dynamic service path when the action is not within the predetermined set of actions and when the action is a public cloud action;
executing, by a dynamic action execution circuitry including the hardware processor, the action selection on the dynamic action execution circuitry when the selected execution path from among multiple pre-defined execution paths comprises the dynamic service path;
listening, by a response listener circuitry including the hardware processor, for an action execution response from the public target hosting platform or the on-premises target hosting platform;
receiving, by a response interface circuitry including the hardware processor, the action execution response from the target hosting platform; and
submitting, by the response interface circuitry including the hardware processor, the action execution response to a normalized service catalog for tracking execution of the action for both a public dynamic service path and an on-premises dynamic service path.

10. The method of claim 9, where:
routing the action selection to the selected execution path comprises: locally queueing the action parameters in a private action queue in the action execution system, when the selected execution path from among multiple pre-defined execution paths comprises of the on-premises dynamic service path.

11. The method of claim 10, further comprising:
configuring the private action queue for remote communication with a specific on-premises target hosting platform assigned to the private action queue for checking and retrieving the action parameters from the private action queue, and remotely executing the action in the specific on-premises target hosting platform instead of in the action execution system.

12. The method of claim 9, where:
routing the action selection to the selected execution path comprises: locally queueing the action parameters in a public action queue in the action execution system, when the selected execution path from among multiple pre-defined execution paths comprises of the public dynamic service path.

13. The method of claim 12, further comprising:
submitting the action parameters to a dynamic action interface configured for pass-through in the normalized service catalog along the normalized service path prior to locally queuing the action parameters in the public action queue.

14. The method of claim 12, further comprising:
retrieving the action parameters from the public action queue;
searching a script database to locate an instruction sequence that defines processing steps that implement the action; and
executing the instruction sequence within the action execution system.

15. The method of claim 9, where:
routing the action selection to the selected execution path comprises: submitting the action parameters to the normalized service catalog for execution of the action along the normalized service path, when the selected execution path from among multiple pre-defined execution paths comprises of the normalized service path.

16. An action execution system, comprising:
an action supervisor circuitry including a hardware processor, the action supervisor circuitry configured to:
generate an action selection interface specifying available actions to execute against a virtual machine provisioned in a target hosting platform,
communicate the action selection interface to a resource requester in control of the virtual machine,
receive, from the resource requester, an action selection of an action to perform against the virtual machine in the target hosting platform, and
search an action database to determine action parameters for executing the action;
a routing circuitry including the hardware processor, the routing circuitry configured to:
facilitate execution of the action responsive to the target hosting platform by determining whether the target hosting platform is a public target hosting platform or an on-premises target hosting platform;
make a processing determination of whether to process the action along a normalized service path, an on-premises dynamic service path, or a public dynamic service path,
choose the normalized service path when the action is within a predetermined set of actions that are already defined and validated across multiple different target hosting environments and when the action is a public cloud action,
choose the public dynamic service path when the action is not within the predetermined set of actions and when the action is a public cloud action,
responsive to the processing determination to process the action is the public dynamic service path, submit the action selection to a dynamic action interface configured for pass-through of a normalized service catalog along the normalized service path, and
responsive to the processing determination to process the action is the normalized service path, submit the action selection to a normalized service interface in the normalized service catalog;
a dynamic action execution circuitry including the hardware processor, the dynamic action execution circuitry configured to:
receive the action selection in return from the normalized service catalog and locally queue the action selection in a public action queue when the processing determination to process the action is the public dynamic service path,
retrieve the action selection from the public action queue when the processing determination to process the action is the public dynamic service path,
search an action definition memory to locate an instruction sequence that defines processing steps that implement the action when the processing determination to process the action is the public dynamic service path,
execute the instruction sequence within the action execution system when the processing determination to process the action is the public dynamic service path,
configure a private action queue for remote communication with an on-premises target hosting platform assigned to the private action queue when the processing determination to process the action is on-premises dynamic service path,
check and retrieve the action selection from the private action queue when the processing determination to process the action is on-premises dynamic service path,
remotely execute the action in the on-premises target hosting platform instead of in the action execution system when the processing determination to process the action is on-premises dynamic service path, and
locally queue the action parameters in the private action queue in the action execution system to await retrieval by the on-premises target hosting platform;
a response listener circuitry including the hardware processor, the response listener circuitry configured to:
listen for an action execution response from the public target hosting platform or the on-premises target hosting platform; and
a response interface circuitry including the hardware processor, the response interface circuitry configured to:
receive the action execution response from the target hosting platform, and submit the action execution response to the normalized service catalog for tracking execution of the action for both the public dynamic service path and the on-premises dynamic service path.

* * * * *